United States Patent [19]

Atkinson

[11] Patent Number: 4,584,825
[45] Date of Patent: Apr. 29, 1986

[54] ATTACHMENT FOR A HARVESTER FOR PICKING UP DOWNED CORN STALKS

[76] Inventor: Cecil G. Atkinson, Rte. 1, Box 149, White City, Kans. 66872

[21] Appl. No.: 579,125

[22] Filed: Feb. 10, 1984

[51] Int. Cl.$^4$ ............................................. A01D 45/02
[52] U.S. Cl. ..................................... 56/119; 56/14.3; 56/94
[58] Field of Search .................. 56/14.3, 98, 110, 111, 56/109, 119, 94, 106

[56] References Cited

U.S. PATENT DOCUMENTS

| | | | |
|---|---|---|---|
| 2,205,707 | 6/1940 | Wooding | 56/119 |
| 3,209,526 | 10/1965 | Morrow | 56/119 |
| 3,584,444 | 6/1971 | Sammann | 56/119 |
| 3,646,737 | 3/1972 | Grant | 56/106 |
| 3,995,413 | 12/1976 | Lynch | 56/119 |
| 4,137,695 | 2/1979 | Sammann | 56/119 |
| 4,249,366 | 2/1981 | Dolberg et al. | 56/119 |
| 4,346,548 | 8/1982 | Atkinson | 56/119 |
| 4,476,667 | 10/1984 | Moss | 56/119 |

Primary Examiner—Gene Mancene
Assistant Examiner—John G. Weiss
Attorney, Agent, or Firm—Leonard Bloom

[57] ABSTRACT

An improvement for an attachment on a harvester which picks up downed corn stalks including a roller supported on a spindle disposed on lateral extremities of the harvester attachment formed from elongate cylinders having radially extending vanes on an outer face thereof, the roller spindle driven by a bevel gear system, one of the bevel gears supported on a drive shaft, the other bevel gear extending from a distal end of the spindle supported for rotatable motion about the driving axle by means of a collar attached to the driving axle, and a chain tensioning instrumentality disposed on harvesting snouts intermediate the lateral extremities including a protective shroud over a portion of the chain.

9 Claims, 4 Drawing Figures

U.S. Patent
Apr. 29, 1986
4,584,825
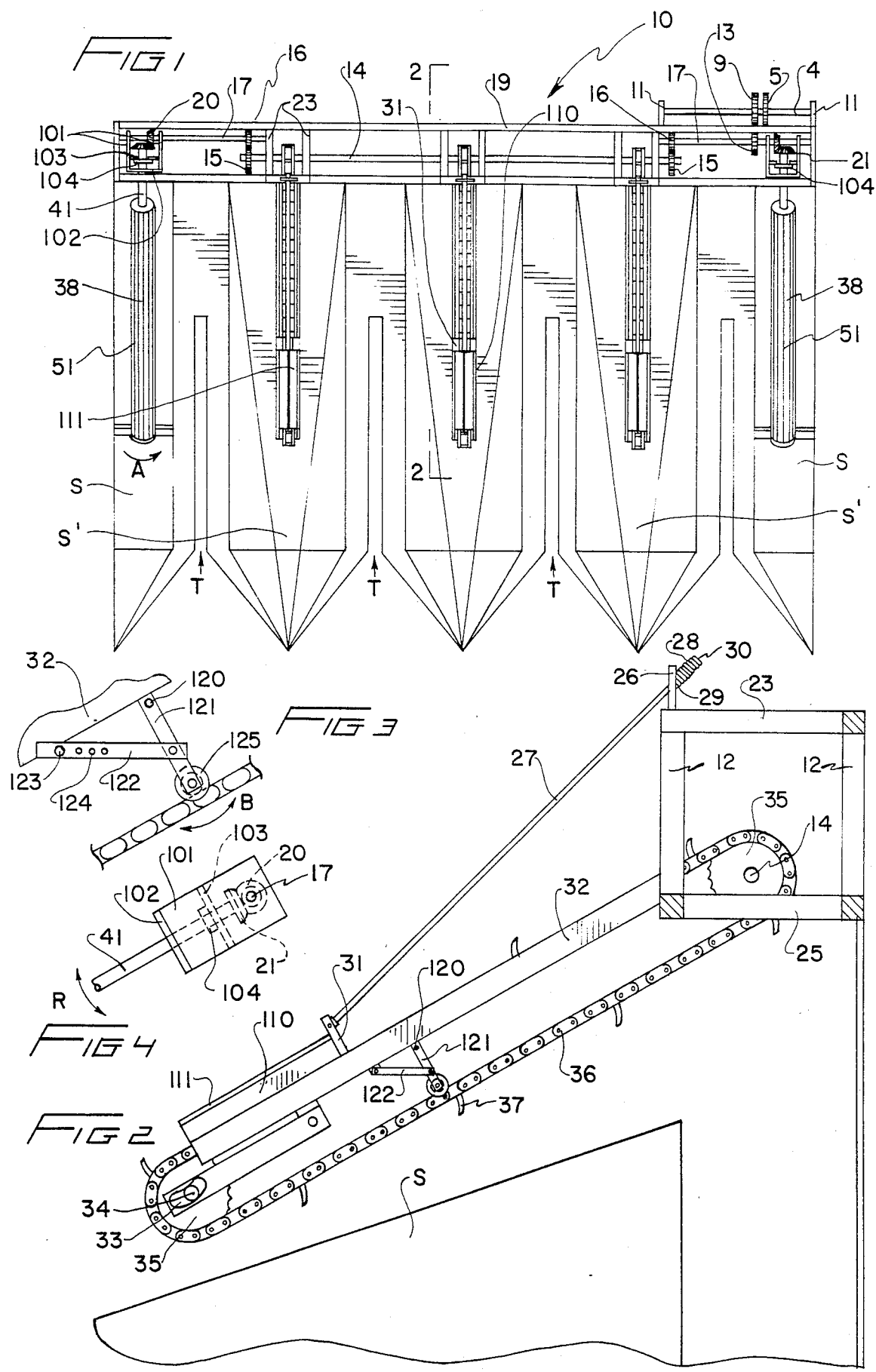

ATTACHMENT FOR A HARVESTER FOR PICKING UP DOWNED CORN STALKS

BACKGROUND OF THE INVENTION

The following constitutes improvements over my U.S. Pat. No. 4,346,548 issued Aug. 31, 1982 which is incorporated in its entirety herewith by reference.

More particularly, the instant invention directs itself to continuing developments over applicant's earlier patent which reflects refinements associated with the basic machine as these refinements have become evident when using and fabricating the earlier machines.

The following citations reflect the state of the art of which applicant is aware insofar as these patents appear to be germane to the process at hand.

| U.S. Pat. No. | 535,228 | 3/1895 | Steiner |
| U.S. Pat. No. | 1,219,327 | 3/1917 | Keeler |
| U.S. Pat. No. | 1,306,317 | 6/1919 | St. John |
| U.S. Pat. No. | 1,826,551 | 10/1931 | Krenzel |
| U.S. Pat. No. | 1,928,868 | 10/1933 | Poen |
| U.S. Pat. No. | 2,648,942 | 8/1953 | Grant et al |
| U.S. Pat. No. | 3,031,832 | 5/1962 | Siefried |
| U.S. Pat. No. | 3,331,196 | 7/1967 | Grant |
| U.S. Pat. No. | 3,584,444 | 6/1971 | Sammann et al |
| U.S. Pat. No. | 3,596,448 | 8/1971 | Boskirk |
| U.S. Pat. No. | 3,646,737 | 3/1972 | Grant |
| U.S. Pat. No. | 3,807,152 | 4/1974 | Storm et al |
| U.S. Pat. No. | 4,048,792 | 9/1977 | Shriver et al |
| U.S. Pat. No. | 4,084,396 | 4/1978 | Fritz et al |
| U.S. Pat. No. | 4,137,695 | 2/1979 | Sammann |
| U.S. Pat. No. | 4,160,355 | 7/1979 | Blake et al |
| U.S. Pat. No. | 4,215,527 | 8/1980 | Schrubb et al |

None of these citations touch at the heart of the invention associated with the instant application.

The instant application is distinguished over the known prior art by firstly the addition of a shroud which overlies a portion of the chain used to encourage downed stalks of corn to pass over the harvester snout and into the throat. By providing a protective shroud, the opportunity for corn stalks to become impacted in certain areas of the chain have been minimized and an enhanced feed rate of the corn stalks into harvester has been evidenced while simultaneously protecting human welfare.

Secondly, the rollers which ar oriented on the laterally extreme snouts of the combine have been modified in two ways. The roller is maintained substantially cylindrical along its entire extent, and the vanes are radially extended from the roller and linearly along the entire path. In addition, the spindle which carries the roller driven by the earlier bevelled gear is now supported in a novel manner so that the roller can rotate about the axle supporting one of the two bevel gears, and in this manner provides a "floating" capability with articulation about the bevelled gears driving axis to accommodate varied terrain and stalk feed rate.

Thirdly, a chain support and tensioning instrumentality is provided on a lowermost face of the chain guard which not only provides appropriate tensioning of the chain but also instantly alters the effective force of the chain against downed corn stalks.

Fourthly, some of the metal shafts used in driving the various and diverse instrumentalities of the combine have been modified for improved weight, balancing and loading capabilities.

OBJECTS AND SUMMARY OF THE INVENTION

Accordingly, this invention has as its objective the provision of a new and novel apparatus for harvesting downed ears of corn.

It is a further object of this invention to provide a device, as characterized above, in which greater tractability has been evidenced in the operative manipulation of the apparatus for harvesting downed ears of corn so that in certain respects play has been taken out of certain components and resilient support has been inserted in other areas.

It is a further object of this invention to provide a device, as characterized above, which exhibits a high degree of safety for the combine operator and allows a greater throughput of downed cornstalks to be fed into the machine.

These and other objects will be made manifest in considering the following detailed specification, when taken in conjunction with the appended drawing figures, wherein there has been provided an instrumentality adapted to be used as an attachment for harvesting and picking up downed corn stalks which includes an improved chain support means which encourages downed stalks to climb over the snout of the conventional combine and into the throat area of the harvester, an instrumentality adapted to encourage stalks on lateral extremeties of the combine to be fed into the throat areas for similar processing, an improved support instrumentality adapted to allow pivoting of rollers on lateral extremities of the combine to accommodate varied and diverse conditions, an instrumentality associated with the combine to provide an improved power transmission of all components through a unitary drive, an improved chain tensioning mechanism and chain guard which gathers the downed stalks whereby greater throughput and enhanced performance can be evidenced.

BRIEF DESCRIPTION OF THE DRAWINGS

FIG. 1 is a top plan view of the apparatus according to the present invention.

FIG. 2 is a sectional view taken along lines 2—2 thereof.

FIG. 3 is a side view partially fragmented of one of the instrumentalities according to the instant application.

FIG. 4 is a side view of a further instrumentality according to the instant application.

BRIEF DESCRIPTION OF THE PREFERRED EMBODIMENT

Referring to the drawings now, wherein like reference numerals refer to like parts throughout the various drawing figures reference mateial 10 is directed to the attachment for a harvestor according to the present invention.

Those elements performing identical functions to applicant's U.S. Pat. No. 4,346,548 bear the same reference numerals. More particularly, the combine can be regarded as having a roller means 38 carried on a top surface of outer dividers S while inner dividers S' each have chains forwardly extending at one end of a frame mechanism to be defined which extends along the longitudinal extent of the inner dividers and further depending from a support rod 27. Traditional combines are provided with a plurality of downwardly extending tapered snouts so that the areas of convergence of adjacent dividers define throat areas T which thereafter progress to longitudinally elongate entrance ways through which upstanding corn normally disposed in rows will pass for processing.

However, downed ears of corn are brought up above the snout of the divider and will be caused to be elevated and returned to an upright condition by means of their engagement with fingers 37 of the chain 36, or, for the outside dividers, be urged inwardly by the rollers' 38 rotation in the direction of the arrow A to urge the bent over or downed corn stalks into the central area of the machine.

FIG. 1 reveals an intermediate shaft 4 operatively connected to a source of power (not shown) which in turn drives by means of a driven sprocket 5 a second sprocket 9 mounted on the same shaft 4. Each of the sprockets are supported on the shaft 4 by means of parallel support plates 11 having central apertures for admission therein of the intermediate shaft 4 with bearings included.

The sprocket 9 in turn drives a roller shaft 17 disposed on the right hand portion of FIG. 1 for example, the roller shaft 17 including a sprocket 13 thereon in meshing engagement with the second sprocket 9. As shown in the figures, a further sprocket 16 communicates with sprocket 15 carried on a driven shaft 4 which driven shaft 14 is coupled to and operatively drives the chain 36 carried on the intermediate snouts that lift up corn in the central path of the combined. An end portion of the driven shaft 14 remote from the drive input 5 includes similarly formed first and second sprockets 15, 16, the sprocket 16 keyed to another roller shaft 7 which operates the roller means 38 on an opposed extremity of the combine so that when contrasted with applicant's earlier patent, the shaft 17 is now discontinuous. In addition, the total length of the driven shaft 14 has thus been abbreviated and serves as a driving means for the second of the two shafts 17.

Each shaft 17 in turn carries a bevel gear 20 thereon, a distal end of the shaft 17 carried on a support disposed at lateral extremities of the combined. A further bevel gear 41 communicates with the first bevel gear 20, the second bevel gear operatively connected to a roller spindle 21 to rotatably drive the same. As is shown, the spindle 41 carries the roller means 38 thereon. In an improved embodiment, the first and second bevel gears 20 and 21 respectively are kept in operative communication by means of a substantially U-shaped housing having legs 101 and a bight portion 102 through which the roller spindle 41 passes. Extremities of the legs 101 are caused to be supported on and overlie the shaft 17 so that rotation of the U-shaped housing about the shaft 17 is afforded. The second bevel gear 21 is maintained in its tangential registry with the first bevel gear 20 by means of a plate 103 extending between the legs 101 of a support bracket housing, the roller spindle 41 constrained from axial translation by means of a combined bearing and notched portion extending along the reinforcing plate 103. Thus, rotation of the roller spindle 14 about the direction of the arrow R (FIG. 4) is possible. The roller means 38 includes an elongate cylindrical section of constant cross-section and a plurality of radially extending vanes 51 disposed thereon. In use and operation therefor, rotation of the spindle 41 and its associated roller 38 causes rotation of the vanes 51 to encourage downed stalks of corn to be fed into the outermost throat areas T and the roller's connection with the snout S at an end remote from bevel gear 21 allows the snout to "float" or rotate about shaft 17 to accomodate varied terrain.

Besides the abbreviated shafts 17, 14 and the ability of the roller means to articulate about the shaft 17, tensioning means for the chain 36 has been provided as well as a means for occluding a portion of the chain from the environment. More particularly, FIGS. 2 and 3 demonstrate that the chain guard 32 has at a bottom most extremity a bolt 120 carried on a bottom face thereof to which is removeably attached a pair of downwardly depending legs 121. A distal portion of the legs 121 serve to support a roller 125 adapted to straddle the side of the chain 36 remote from the resilient fingers 37. Thus, the legs 21 in cooperation with the roller 125 can alter the spacing of the chain from the guard 32. In order to accommodate variations in chain due to stretching, etc., a further leg 122 is applied to a medial portion of the downwardly depending legs 121 and extends to a further bolt 123 welded to the underside of the chain guard 32. Since the angulated leg 122 has a plurality of holes 124 thereon, rotation of leg 121 about the direction of the arrows B can alter the effective distance of the chain 36 from the guard 32.

FIG. 2 reflects a housing having upstanding walls 110 disposed on opposite sides of the guard 32, and a roof 111 therefor having an apex defined by an inverted V coextensive with the entire length of the side walls 110. In this way, a leading edge of the guard 32 is shielded in such a manner that stalks of corn can pass over a portion of the thus formed shield 110, 111 and not become a source of binding in the chain mechanism. A trailing edge of the chain housing 110, 111 includes an inverted Y-shaped support bracket 31 having an upwardly extending tang connected to the suspension rod 27. The splayed terminal portion of the inverted Y-shaped support bracket 31 is welded to the chain guard 32 on opposed extremities thereof.

Having thus described the prefered embodiment of the invention, it should be understood that numerous structural modifications and adaptations may be resorted to without departing from the spirit of the invention as set forth hereinabove and as defined hereinbelow by the claims.

What is claimed is:

1. A harvester for gathering stalks of corn or the like which may not necessarily be vertically upright in the field comprising in combination:

a plurality of snouts laterally spaced from each other having a throat area between adjacent snouts defining passageways through which the stalks of corn are adapted to pass, roller means carried on the top surface of the outer snouts, and means for pivoting said roller means at one end thereof about an axis transverse to the direction of travel of the harvester.

2. The device of claim 1 including a plurality of chains placed on each said snout intermediate said roller means, and means substantially intermediate the turn-around portions of each of said chains for tensioning said chains, wherein said means for tensioning each said chain includes a chain guard about which said chain passes, a downwardly extending leg having a idler roller at a distal end thereof upon which the chain rides, and an angulated bracing member extending medially from said leg to a bottom face of said guard.

3. The device of claim 2 including an overlying shroud on a top face of each of said chains.

4. The device of claim 3 wherein said roller means is formed as an elongate roller cylinder carried on a roller spindle, said roller cylinder having a plurality of radially extending vanes along its entire longitudinal extent.

5. The device of claim 4 wherein said means for pivoting said roller means and said roller spindle is carried on a spindle support bracket of substantially U-shaped configuration having legs and an associated bight portion, said legs having apertures overlying a driving shaft allowing rotation of said bracket and therefor said spindle thereabout, said spindle passing through said bight portion and terminating at a distal end thereof with and a bevel gear adapted to communicate with a bevel gear provided on said driving shaft.

6. The device of claim 5 including a support plate spaced from and parallel to said bight portion and interconnected to said legs to provide further support for said spindle, said plate operatively connected to and supporting said spindle.

7. The device of claim 2 wherein said angulated brace is formed with a plurality of holes one of which is adapted to register with an associated bolt on said chain guard for adjustment of said idler roller.

8. The device of claim 7 wherein a shroud is provided with two side walls extending upwardly from said guard and includes a top cover having an inverted V-shaped configuraiton.

9. The device of claim 8 wherein said shroud has at a trailing portion thereof an inverted Y-shaped bracket with an upstanding portion of said bracket communicating with a shock absorbing rod, whereby said chain guard is carried thereby and capable of motion similar to said roller means carried on the outer snouts.

* * * * *